US012600635B2

(12) United States Patent
Zeng et al.

(10) Patent No.:  US 12,600,635 B2
(45) Date of Patent:     Apr. 14, 2026

(54) PROCESS AND DEVICE FOR PREPARING GRAPHENE QUANTUM MATERIAL

(71) Applicants:Yunnan Huapu quantum Material Co., Ltd, Kunming (CN); Chongqing Institute of East China Normal University, Chongqing (CN); East China Normal University, Shanghai (CN); ROI Optoelectronics Technology CO, LTD., Shanghai (CN); Chongqing Huapu Scientific Instrument Co., Ltd., Chongqing (CN); Chongqing Huapu Intelligent Equipment Co., Ltd., Chongqing (CN); GuangDong ROI Optoelectronics Technology Co., Ltd., Dongguan (CN)

(72) Inventors: Heping Zeng, Chongqing (CN); Mengyun Hu, Chongqing (CN); Chuan Yang, Chongqing (CN)

(73) Assignees: YUNNAN HUAPU QUANTUM MATERIAL CO., LTD, Kunming (CN); CHONGQING INSTITUTE OF EAST CHINA NORMAL UNIVERSITY, Chongqing (CN); EAST CHINA NORMAL UNIVERSITY, Shanghai (CN); ROI OPTOELECTRONICS TECHNOLOGY CO, LTD., Shanghai (CN); CHONGQING HUAPU SCIENTIFIC INSTRUMENT CO., LTD., Chongqing (CN); CHONGQING HUAPU INTELLIGENT EQUIPMENT CO., LTD., Chongqing (CN); GUANGDONG ROI OPTOELECTRONICS TECHNOLOGY CO., LTD., Dongguan (CN)

( * ) Notice: Subject to any disclaimer, the term of this patent is extended or adjusted under 35 U.S.C. 154(b) by 718 days.

(21) Appl. No.: 17/936,204

(22) Filed: Sep. 28, 2022

(65) Prior Publication Data

US 2023/0103114 A1     Mar. 30, 2023

(30) Foreign Application Priority Data

Sep. 29, 2021    (CN) .......................... 202111149446.7

(51) Int. Cl.
*C01B 32/194*          (2017.01)

(52) U.S. Cl.
CPC .................................. *C01B 32/194* (2017.08)

(58) Field of Classification Search
None
See application file for complete search history.

(56) References Cited

FOREIGN PATENT DOCUMENTS

| CN | 110167877 A | 8/2019 |
|---|---|---|
| CN | 112265983 A | 1/2021 |
| CN | 212356552 U | 1/2021 |

OTHER PUBLICATIONS

Lin et al, CN 112265983 A, English translation from FIT (Year: 2021).*

(Continued)

*Primary Examiner* — Colin W. Slifka
(74) *Attorney, Agent, or Firm* — Hodgson Russ LLP

(57) ABSTRACT

A process for preparing a graphene quantum material includes: providing a carbon-containing precursor; decomposing the carbon-containing precursor with ultra-fast laser to obtain the graphene quantum material; optionally reduc-
(Continued)

ing graphene oxide into graphene with laser; and optionally subjecting the graphene quantum material to microwave heating.

12 Claims, 5 Drawing Sheets

(56)                References Cited

OTHER PUBLICATIONS

CNIPA, First Office Action for CN Application No. 202111149446. 7, Mar. 10, 2023.

* cited by examiner molecular decomposition
and reconstruction resonant excitation of
molecular vibration mode excited state hv $nh\nu \ (n{\geq}2)$ effect of two or more photons hv hv ground state low energy molecular stable mode (graphene quantum material)

ultra-fast laser decomposition (carbon-containing
precursor material)

FIG. 1B                 FIG. 1C

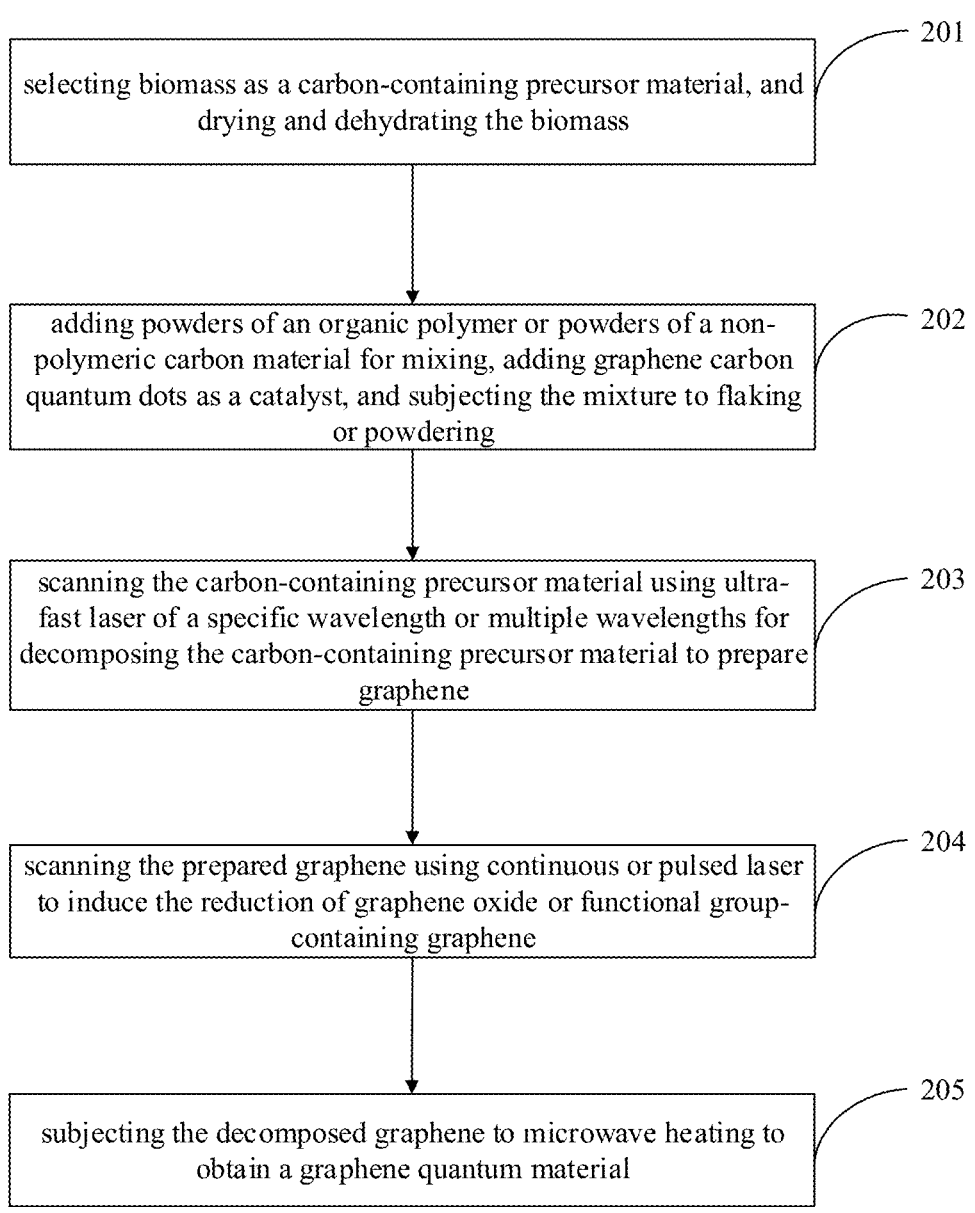

selecting biomass as a carbon-containing precursor material, and drying and dehydrating the biomass — 201 adding powders of an organic polymer or powders of a non-polymeric carbon material for mixing, adding graphene carbon quantum dots as a catalyst, and subjecting the mixture to flaking or powdering — 202 scanning the carbon-containing precursor material using ultra-fast laser of a specific wavelength or multiple wavelengths for decomposing the carbon-containing precursor material to prepare graphene — 203 scanning the prepared graphene using continuous or pulsed laser to induce the reduction of graphene oxide or functional group-containing graphene — 204 subjecting the decomposed graphene to microwave heating to obtain a graphene quantum material — 205

FIG. 2

PROCESS AND DEVICE FOR PREPARING GRAPHENE QUANTUM MATERIAL

CROSS-REFERENCE TO RELATED APPLICATION

This application claims priority to and benefits of Chinese Patent Application No. 202111149446.7, filed on Sep. 29, 2021, the entire disclosure of which is incorporated herein by reference.

FIELD

The present disclosure belongs to the technical field of processing a graphene material, and more particularly to a process and a device for preparing a graphene quantum material.

BACKGROUND

Graphene, as a new type of carbon material with a two-dimensional honeycomb structure, has excellent electrical and thermal conductivity, mechanical properties, large specific surface area, and ultra-light properties. Therefore, graphene materials have been widely concerned and studied, which can be applied to prepare a high-performance composite material, an environmental purification material, an energy storage electrode material, a thermal conductivity and heat dissipation material, and are widely used in energy, environment, semiconductors, biomedicine, aerospace and other fields. In addition to the application in advanced fields, graphene materials and products have come into people's daily life. Therefore, it is more and more important to control preparation methods, efficiency, and cost of graphene. It can be seen that the preparation methods of graphene materials require continuous development and innovation to lead the development of the graphene industry and its related applications, and even change people's daily life.

SUMMARY

In an aspect of the present disclosure, a process for preparing a graphene quantum material is provided, including providing a carbon-containing precursor, decomposing the carbon-containing precursor with ultra-fast laser to obtain the graphene quantum material, optionally reducing graphene oxide into graphene with laser, and optionally subjecting the graphene quantum material to microwave heating.

In another aspect of the present disclosure, a device for preparing a graphene quantum material includes a laser component including an ultra-fast laser. The ultra-fast laser is configured as an energy source for decomposing a carbon-containing precursor with ultra-fast laser to obtain the graphene quantum material and selected from a single-wavelength, dual-wavelength or multi-wavelength ultra-fast laser.

BRIEF DESCRIPTION OF THE DRAWINGS

FIGS. 1A-1D are schematic diagrams of the principle of ultra-fast laser resonant excitation and an example diagram for preparing a graphene quantum material in an embodiment of the present disclosure, in which FIG. 1A is a schematic diagram of the principle of resonant excitation of the ultra-fast laser, FIG. 1B is a macroscopic photo of a prepared 2 cm×2 cm flake graphene quantum material, FIG.

1C is a micrograph of a prepared 2 cm×2 cm flake graphene quantum material, and FIG. 1D shows Raman spectra of a prepared 2 cm×2 cm flake graphene quantum material.

FIG. 2 is a flowchart showing a process for preparing a graphene quantum material in an embodiment of the present disclosure.

DETAILED DESCRIPTION

Figure 1A:
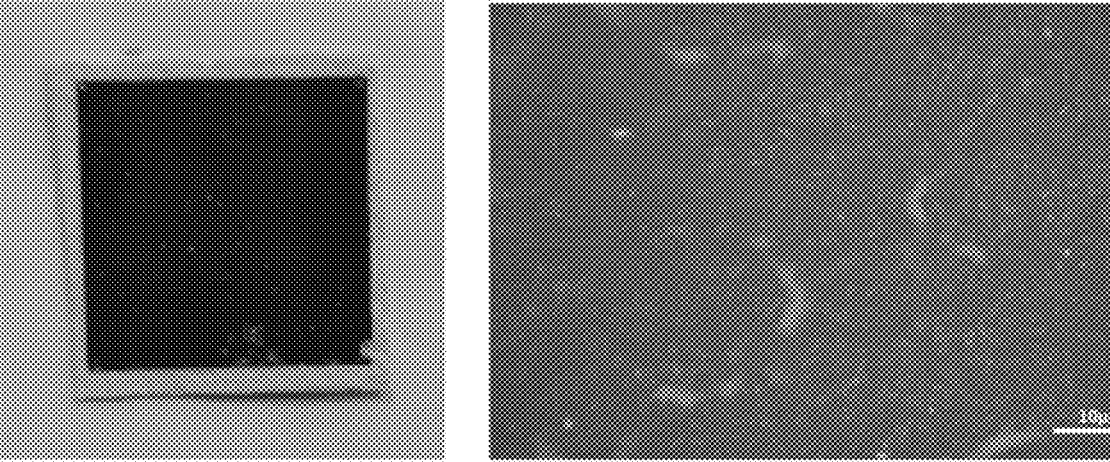

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having the same or similar functions are denoted by like reference numerals throughout the descriptions.

At present, commonly used methods for preparing graphene include mechanical exfoliation, epitaxial growth, chemical vapor deposition, and the redox method. In addition, laser-induced graphene (LIG) technology uses the photothermal effect of laser on a material to increase the temperature of a local area of the material, resulting in the breaking of chemical bonds of the material, accompanied by the recombination of new carbon-carbon single and double bonds to form graphene. Thus, LIG technology has been widely concerned and applied. The present disclosure is based on the method of preparing graphene with laser, using ultra-fast laser as an energy source, using the photochemical effect of ultra-fast laser of a specific wavelength or multiple wavelengths on organic molecules in the material to cause the corresponding chemical bonds in the molecules to be broken and decomposed to form graphene, that is, an ultra-fast laser decomposed graphene (ULDG) process. The ULDG process is dominated by the photochemical effect of ultra-fast laser in the processing process and has no thermal effect near the laser processing area of the material. The molecular vibration mode excited by the resonance of two or more photons of the ultra-fast laser can be used to realize the molecular processing such as chemical bond breaking and reconfiguration of various carbon-containing precursor molecules, so as to realize the decomposition of various materials to prepare graphene quantum materials. In the process of the photochemical effect, material molecules absorb photons, which causes energy level transition of internal electrons to form unstable excited states. The lifetime of molecules in the excited states is extremely short, and reactions such as rapid decomposition occur. Since excitation lasers of different wavelengths have different energies, and the chemical bonds of material molecules correspond to different bond energies. This process can also achieve selective decomposition of chemical bonds or groups by controlling excitation wavelengths of laser, and thus achieve a precise "molecular tailoring" to prepare graphene with specific functional groups.

An ultra-fast laser decomposed graphene process proposed in the present disclosure uses resonant excitation with ultra-fast laser of a specific wavelength or multiple wavelengths to make organic molecules in a material reach a vibrational mode, and generate the photochemical effect to realize the decomposition of a carbon-containing precursor material to prepare graphene. Specifically, after the organic molecules in the carbon-containing precursor material absorb two or more photons, the organic molecules transform from a stable ground state to an unstable excited state, and the organic molecules in the excited state vibrate at high speed to stretch vibration of the corresponding chemical bonds inside the material to break the chemical bonds, and graphene is formed by the re-bonding of carbon elements. The present disclosure can make full use of the thermal shock effect of the ultra-fast laser, significantly increase the decomposition depth of graphene prepared by single laser scanning, and improve the preparation efficiency of graphene. Meanwhile, based on the photochemical effect of the ultra-fast laser on the material, the laser energy required for decomposing is low. Moreover, by controlling specific excitation wavelengths, specific functional groups of the prepared graphene can be retained, and the graphene with specific functional groups can be prepared. In addition, based on the fact that there is no thermal effect in the process of processing with the ultra-fast laser, as well as the advantage of being able to precisely control the dimensional accuracy of a processing area to a micro-nano level, the present disclosure can directly process a micro-nano structure of graphene.

The object of the present disclosure is to provide a process and a device for preparing a graphene quantum material, which utilizes the photochemical effect of ultra-fast laser of a specific wavelength or multiple wavelengths on organic molecules in a carbon-containing precursor material to decompose the carbon-containing precursor material to prepare a graphite quantum material. Thus, the preparation efficiency of the graphene is significantly improved, the preparation cost is reduced, the preparation of graphene with a special functional group can be realized, and the special nano-micro structure of graphene can be processed directly.

In order to achieve the above objective, the technical solutions of the present disclosure are as follows.

In an aspect of the present disclosure, a process for preparing a graphene quantum material is provided, including providing a carbon-containing precursor, decomposing the carbon-containing precursor with ultra-fast laser to obtain the graphene quantum material, optionally reducing graphene oxide into graphene with laser, and optionally subjecting the graphene quantum material to microwave heating.

In the process of preparing the graphene quantum material, ultra-fast laser is mainly utilized to resonantly excite the vibration mode of organic molecules in a carbon-containing precursor material and enable the organic molecules to have higher energy to break corresponding chemical bonds therein, and the carbon-containing precursor material is decomposed and bonds are re-formed to prepare the graphene quantum material.

In some embodiments, the graphene quantum material includes at least one of graphene powders, graphene quantum dots, and graphene mesoporous materials. The process further includes coating a substrate with one or more layers including the graphene quantum material.

In some embodiments, the carbon-containing precursor material includes biomass containing cellulose, lignin, or starch. The biomass is selected from plant biomass, including crop straws and husks, wood, wood chips, barks, branches, roots, leaves, fruits, and vegetables.

In some embodiments, providing the carbon-containing precursor includes adding one or more of powders of an organic polymer and powders of a non-polymeric carbon material to flakes or powders of the biomass. The organic polymer includes at least one of polyimide (PI), polyethylene (PE), and polypropylene (PP). The non-polymeric carbon material includes at least one of graphite, charcoal, carbon black, and coal.

In some embodiments, the process for preparing the graphene quantum material further includes drying the plant biomass; or carbonizing the plant biomass in vacuum.

In some embodiments, decomposing the carbon-containing precursor includes adding one or more of graphite quantum dots, graphene oxide quantum dots, and graphene quantum dots to the carbon-containing precursor material as a catalyst. The quantum dots perform high-speed vibration during the laser-induced preparation process to realize the catalysis of the intercalation, infiltration, and induced decomposition of the carbon-containing precursor material to prepare graphene.

In some embodiments, the ultra-fast laser is picosecond laser or femtosecond laser, preferably femtosecond laser.

In some embodiments, the ultra-fast laser is at an ultraviolet to near-infrared, mid-infrared, or far-infrared wavelength region, and in a wavelength range of 200 to 14000 nm.

In some embodiments, the ultra-fast laser is single-wavelength laser, dual-wavelength laser, multi-wavelength laser, or a combination thereof. With the dual-wavelength or multi-wavelength laser, different chemical bonds or groups in a molecule can be cleaved by controlling the resonant excitation of stretching vibration of different chemical bonds with ultra-fast laser of different wavelengths to achieve selective induced cleavage. Simultaneously induced cleavage or stepwise induced cleavage can be performed with dual-wavelength or multi-wavelength laser.

In some embodiments, decomposing the carbon-containing precursor with ultra-fast laser includes decomposing the carbon-containing precursor with laser points or lines at a processing position selected from a laser focusing position or a laser defocusing position in a laser scanning mode selected from single continuous scanning or multiple cyclic scanning. Thus, point scanning or line scanning can be achieved.

In some embodiments, after the carbon-containing precursor is decomposed with ultra-fast laser to obtain the graphene quantum material, optionally, graphene oxide is reduced into graphene with laser, for performing laser-induced reduction of graphene oxide or graphene containing an organic functional group in the graphene quantum material.

In some embodiments, the laser for reducing the graphene oxide into graphene is selected from continuous laser or pulsed laser.

In some embodiments, the laser for reducing the graphene oxide into graphene is at an ultraviolet wavelength region of 200 to 400 nm, a visible wavelength region of 400 to 760 nm, or an infrared wavelength region of 760 to 14000 nm.

In some embodiments, reducing graphene oxide into graphene with laser includes reducing graphene oxide into graphene with laser points or lines at a processing position selected from a laser focusing position or a laser defocusing position in a laser scanning mode selected from single continuous scanning or multiple cyclic scanning. Thus, point scanning or line scanning can be achieved.

In some embodiments, optionally, microwave heating is carried out for achieving different degrees of expansion of the prepared graphene.

In some embodiments, microwave heating is carried out in an inert environment or in a vacuum environment, and the microwave is selected from continuous microwave or pulsed microwave.

The present disclosure discloses a process and a device for preparing a graphene quantum material, which mainly utilizes ultra-fast laser to resonantly excite the vibration mode of organic molecules in a carbon-containing precursor material and to enable them to have higher energy to break corresponding chemical bonds therein, and the carbon-containing precursor material is decomposed and recombined into bonds to prepare a graphene quantum material. It is possible to significantly increase the decomposing depth, and improve the efficiency of preparing the graphene quantum material. At the same time, biomass is used as the carbon-containing precursor material, which significantly reduces the material cost of preparing the graphene quantum material.

In another aspect of the present disclosure, a device for preparing a graphene quantum material includes a laser component including an ultra-fast laser. The ultra-fast laser is configured as an energy source for decomposing a carbon-containing precursor with ultra-fast laser to obtain the graphene quantum material, and selected from a single-wavelength, dual-wavelength, or multi-wavelength ultra-fast laser.

In some embodiments, the laser component further includes a continuous/pulsed laser, a laser switching mechanism, a two-dimensional motion system, and a focusing system. The continuous/pulsed laser is configured as an energy source for laser-induced reduction of graphene oxide or functional group-containing graphene and selected from a continuous or pulsed laser. The laser switching mechanism is configured for switching the ultra-fast laser and the continuous/pulsed laser. The two-dimensional motion system is configured to implement scanning with the ultra-fast laser or the continuous/pulsed laser. The focusing system is configured to focus the ultra-fast laser or the continuous/pulsed laser, and adjust the focal spot position of the ultra-fast laser or the continuous/pulsed laser.

In some embodiments, the device further includes a microwave component. The microwave component includes a microwave source and a waveguide. The microwave source is configured as an energy source for microwave processing of the graphene quantum material and selected from a continuous microwave source or a pulsed microwave source. The waveguide is connected to the microwave source and configured to transmit the microwave from the microwave source.

In some embodiments, the device further includes a processing component. The processing component includes a feeding and discharging chamber configured to feed the carbon-containing precursor or discharge the graphene quantum material, and a processing chamber configured to process the carbon-containing precursor to obtain the graphene quantum material. The processing chamber is connected to or disconnected from the feeding and discharging chamber via an automatic lifting door, and has a volume larger than the feeding and discharging chamber. The feeding and discharging chamber has a small volume, and can quickly reach a vacuum environment condition after material feeding or discharging is completed. The processing chamber has a large volume and can maintain a stable vacuum environment condition when communicating with the feeding and discharging chamber.

The feeding and discharging chamber includes a feeding and discharging port for feeding the carbon-containing precursor or discharging the graphene quantum material; a first processing platform on which the carbon-containing precursor is placed; a first vacuum valve configured to control a vacuum condition in the feeding and discharging chamber; and a bleed valve.

The processing chamber includes a second processing platform, a platform exchanging mechanism, a laser window, a microwave inlet, and a second vacuum valve. The carbon-containing precursor is placed in the second processing platform. The platform exchanging mechanism is connected to the first processing platform and the second processing platform, and configured for position exchanging of the first processing platform and the second processing platform. The ultra-fast laser or the continuous/pulsed laser is introduced into the processing chamber through the laser window and acts on the carbon-containing precursor on the second processing platform. The microwave inlet is communicated with the waveguide, and the microwave is introduced into the processing chamber through the microwave inlet, and acts on the carbon-containing precursor on the second processing platform. The second vacuum valve is configured to control a vacuum condition in the processing chamber.

In some embodiments, the device further includes a vacuum system configured to control the vacuum condition in the processing component. The vacuum system includes a first vacuum pipe and a second vacuum pipe; a first on/off switch and a second on/off switch; and a vacuum pump. The vacuum pump is connected to the first vacuum valve via the first vacuum pipe and the first on/off switch to control the vacuum condition in the feeding and discharging chamber. The vacuum pump is also connected to the second vacuum valve via the second vacuum pipe and the second on/off switch to control the vacuum condition in the processing chamber.

In some embodiments, the device further includes a control system connected to the laser component, the microwave component, the processing component and the vacuum system, and configured to control the laser component, the microwave component, the processing component and the vacuum system. The control system is configured to regulate the parameters of the ultra-fast laser or the continuous/pulsed laser, turn on or off the ultra-fast laser or the continuous/pulsed laser, switch the ultra-fast laser and the continuous/pulsed laser, and control two-dimensional motion scanning of the ultra-fast laser or the continuous/pulsed laser. The control system is further configured to regulate the parameters of the microwave source and turn on or off the microwave source. The control system is further configured to automatically control the feeding of the carbon-containing precursor and the discharging of the graphene quantum material. The control system is further configured to turn on or off the vacuum pump.

The device in an embodiment of the present disclosure includes a laser component, a microwave component, a processing component, a vacuum system, and a control system, and can realize a high degree of integration and automation, including ultra-fast laser decomposition, continuous/pulsed laser-induced reduction, and microwave heating.

The present disclosure has the following advantages due to adopting the above-mentioned technical solutions.

It is possible to utilize an ultra-fast laser as a processing energy source, and make full use of the thermal shock effect of the ultra-fast laser on a carbon-containing precursor material to significantly increase a decomposing depth, and realize decomposition on a surface, a near-surface, and an interior of the material to prepare the graphene. Thus, the preparation efficiency of graphene is improved.

A vibration mode of organic molecules in the carbon-containing precursor material is resonantly excited with the ultra-fast laser, and the molecules are transformed from a ground state to an excited state by absorbing photons of a specific wavelength. The process of decomposing the molecules to prepare graphene under the condition of lower laser power can be realized by the photochemical effect, which significantly reduces the power of laser processing.

Biomass is mainly used as the carbon-containing precursor material, which significantly reduces the cost of raw materials. Moreover, the process of decomposing the carbon-containing precursor material to prepare graphene is free of harmful and toxic gases and products, and the preparation process is green and pollution-free.

It is possible to realize the preparation of a graphene quantum material containing a special functional group by controlling the wavelength of ultra-fast laser. At the same time, the ultra-fast laser can effectively control the thermal effect area in the processing process, which can realize the direct processing of a special micro-nano structure of graphene.

The present disclosure provides a process and a device for preparing a graphene quantum material, mainly taking biomass as a carbon-containing precursor material, and using ultra-fast laser to resonantly excite a vibrational mode of organic molecules in the biomass, thus realizing a reaction dominated by the photochemical effect and decomposing the carbon-containing precursor material to prepare the graphene quantum material. The present disclosure will be further described below in connection with the accompanying drawings and examples.

FIGS. 1A-1D are schematic diagrams of the principle of ultra-fast laser resonant excitation and an example diagram for preparing a graphene quantum material in an embodiment of the present disclosure.

Referring to FIG. 1A, ultra-fast laser resonant excitation can make a stable mode of a molecule with lower energy in a ground state to be excited and transformed into a resonant mode of the molecule with higher energy in an excited state. The specific principle is that, under the action of two or more photons of ultra-fast laser, the molecule in the ground state absorbs two or more photons to excite an electron, and the molecule is raised from the ground state to the excited state. At this time, the molecule in the excited state is in a vibration mode resonantly excited by the laser, and has higher energy and a shorter lifetime. The "shearing" of a chemical bond of the molecule is realized by stretching vibration of the chemical bond, which realizes rapid decomposition and reconstruction of the molecule to form a new molecular structure. Based on the above principle and process, it is possible to realize the conversion of a carbon-containing precursor material into a graphene quantum material by ultra-fast laser decomposition.

Ultra-fast laser of different wavelengths has different photon energies. As the wavelength increases, the optical frequency decreases gradually and the photon energy becomes smaller gradually, i.e., the photon energy of ultra-violet light, visible light, near-infrared light, mid-infrared light, and far-infrared light becomes smaller gradually. Similarly, different chemical bonds in the molecule have different bonding energies. Breakage of different chemical bonds can be achieved by resonant excitation of the vibration mode of the molecule with ultra-fast laser of a specific wavelength or multiple wavelengths. When the photon energy absorbed by the molecule is large enough, the chemical bonds in the molecule can be completely broken.

Figure 1D:
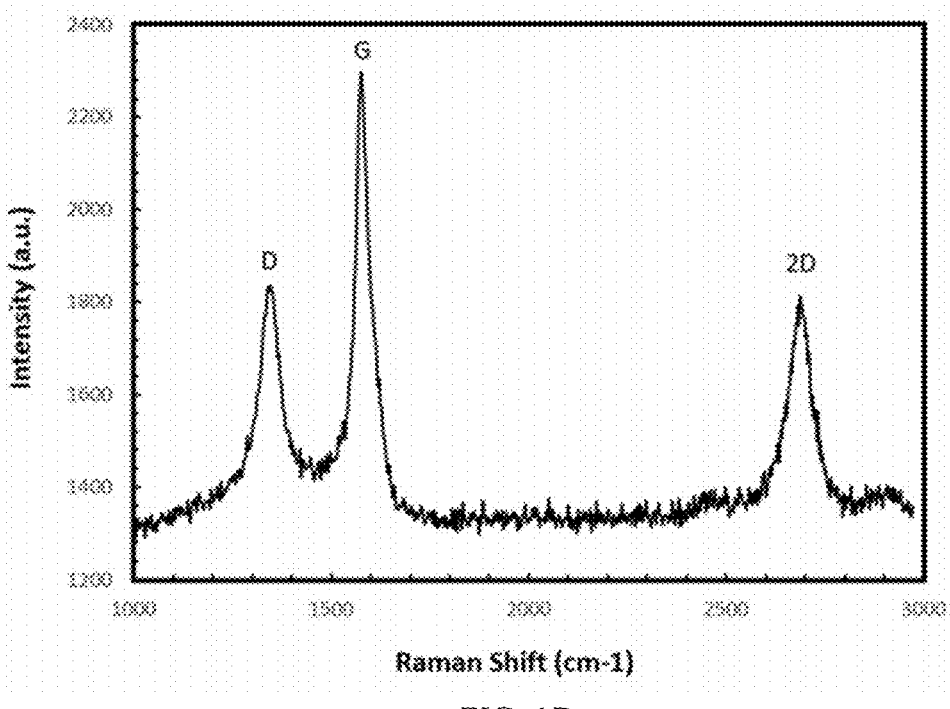

Referring to FIGS. 1B-1D, a flake graphene quantum material prepared based on the principle of the above ultra-fast laser resonant excitation, the specific preparation method and process are shown in Example 1. FIGS. 1B-1D are a macroscopic photo, a micrograph, and Raman spectra of a prepared 2 cm×2 cm flake graphene quantum material, respectively.

FIG. 2 is a flowchart showing a process for preparing a graphene quantum material in an embodiment of the present disclosure.

Firstly, biomass is selected as a carbon-containing precursor material, and is dried and dehydrated (201). The biomass is preferably plant biomass, including, but not limited to, crop straws and husks, wood, wood chips, barks, branches, roots, leaves, fruits and vegetables. In particular, for example, industrial hemp barks, hemp stalks, hemp roots can be used as the carbon-containing precursor material to prepare a high-performance graphene quantum material.

Subsequently, powders of an organic polymer such as polyimide (PI), polyethylene (PE), and polypropylene (PP), or powders of a non-polymeric carbon material such as graphite, charcoal, carbon black, and coal can be selectively added to the carbon-containing precursor material (202). Graphite quantum dots, graphene oxide quantum dots, or graphene quantum dots can be added to the carbon-containing precursor material as a catalyst. The above components are mixed thoroughly according to production requirements, and subjected to flaking or powdering treatment to obtain a flake raw material or a powder raw material, which is to be used for preparing the graphene quantum material.

Subsequently, the prepared flake or powder raw material is placed on a processing platform, and subjected to scanning with ultra-fast laser of a specific wavelength or multiple wavelengths to decompose the carbon-containing precursor material into graphene (203).

Subsequently, the decomposed material is subjected to scanning with continuous or pulsed laser to induce the reduction of graphene oxide and functional group-containing graphene to graphene. The continuous or pulsed laser-induced reduction can be selectively employed according to preparation requirements (204).

Finally, the graphene is subjected to microwave heating in an inert environment or in a vacuum environment to obtain the graphene quantum material (205).

Examples 1 to 3 are implemented based on the above preparation process.

Example 1

In this example, a graphene quantum material was prepared by induced decomposition with single-wavelength femtosecond laser at a central wavelength of 515 nm, with powders of hemp stalks and PI powders as a carbon-containing precursor material. The specific steps were as follows.

Coarse powders of hemp stalks were dried at 80 to 90° C. for 4 to 5 h. After drying, the coarse powders of hemp stalks were ball-milled into fine powders with an average particle size in the range of 5 to 25 μm.

500 mg of fine powders of hemp stalks were mixed with 50 mg of PI powders in a mass ratio of 10:1, while 10 mg of graphene quantum dots were added as a catalyst. 15 mL of an acrylic emulsion in a concentration of 10 to 15% was added as an adhesive.

The mixed raw materials were evenly laid flat on a glass slide with their thickness controlled in the range of 0.5 to 1.0 mm and were dried at 80 to 90° C. for 4 to 5 h. The flake sample was removed and further pressed, and cut into a square flake specimen of 2 cm×2 cm.

The prepared flake specimen is placed on a laser processing platform, and single continuous scanning was performed at a focal position by using femtosecond laser with a central wavelength of 515 nm and a pulse width of 500 fs.

Microsecond laser with a central wavelength of 1030 nm and a pulse width of 15 μs was used to perform single continuous scanning at the focal position to obtain a flake graphene quantum material.

Example 2

In this example, a graphene quantum material was prepared by induced decomposition with dual-wavelength picosecond laser at a central wavelength of 343/515 nm, with powders of hemp stalks and carbon black powders as a carbon-containing precursor material. The specific steps were as follows.

Coarse powders of hemp stalks were dried at 80 to 90° C. for 4 to 5 h. After drying, the coarse powders of hemp stalks were ball-milled into fine powders with an average particle size in the range of 5 to 25 μm.

500 mg of fine powders of hemp stalks were mixed with 100 mg of carbon black powders in a mass ratio of 5:1, while 20 mg of graphene quantum dots were added as a catalyst.

The mixed raw materials for a powder specimen were evenly laid flat on a nickel sheet and placed on a laser processing platform.

Twice continuous scanning was performed at a defocusing position at a height of 2 mm from a focal position by using picosecond laser with a central wavelength of 343 nm and a pulse width of 10 ps, laser was switched, and twice continuous scanning was performed at the defocusing position by using picosecond laser with a central wavelength of 515 nm and a pulse width of 10 ps.

Scanning was performed at the focal position by using microsecond laser with a central wavelength of 1030 nm and a pulse width of 15 μs.

A specimen that had undergone ultra-fast laser-induced decomposition and laser-induced reduction was placed in a vacuum microwave device to perform microwave processing for expansion to obtain powders of a graphene quantum material.

Example 3

In this example, a graphene quantum material was prepared by induced decomposition with a multi-wavelength picosecond laser at a central wavelength of 343/515/1030 nm, with powders of hemp stalks as a carbon-containing precursor material. The specific steps were as follows.

Coarse powders of hemp stalks were dried at 80 to 90° C. for 4 to 5 h. After drying, the coarse powders of hemp stalks were ball-milled into fine powders with an average particle size in the range of 5 to 25 μm.

500 mg of fine powders of hemp stalks were taken, and 15 mg of graphene quantum dots were added to the prepared fine powders of hemp stalks as a catalyst.

The mixed raw materials for a powder specimen were evenly laid flat on a nickel sheet and placed on a laser processing platform.

Single continuous scanning was performed at a focal position by using picosecond laser with a central wavelength of 343 nm and a pulse width of 10 fs. Laser was switched, and single continuous scanning was performed at the focal position by using picosecond laser with a central wavelength of 515 nm and a pulse width of 10 ps. Laser was switched, and single continuous scanning was performed at the focal position by using picosecond laser with a central wavelength of 1030 nm and a pulse width of 10 ps.

A specimen that had undergone ultra-fast laser-induced decomposition was placed in a vacuum microwave device to perform microwave processing for expansion to obtain powders of a graphene quantum material.

Figure 3:
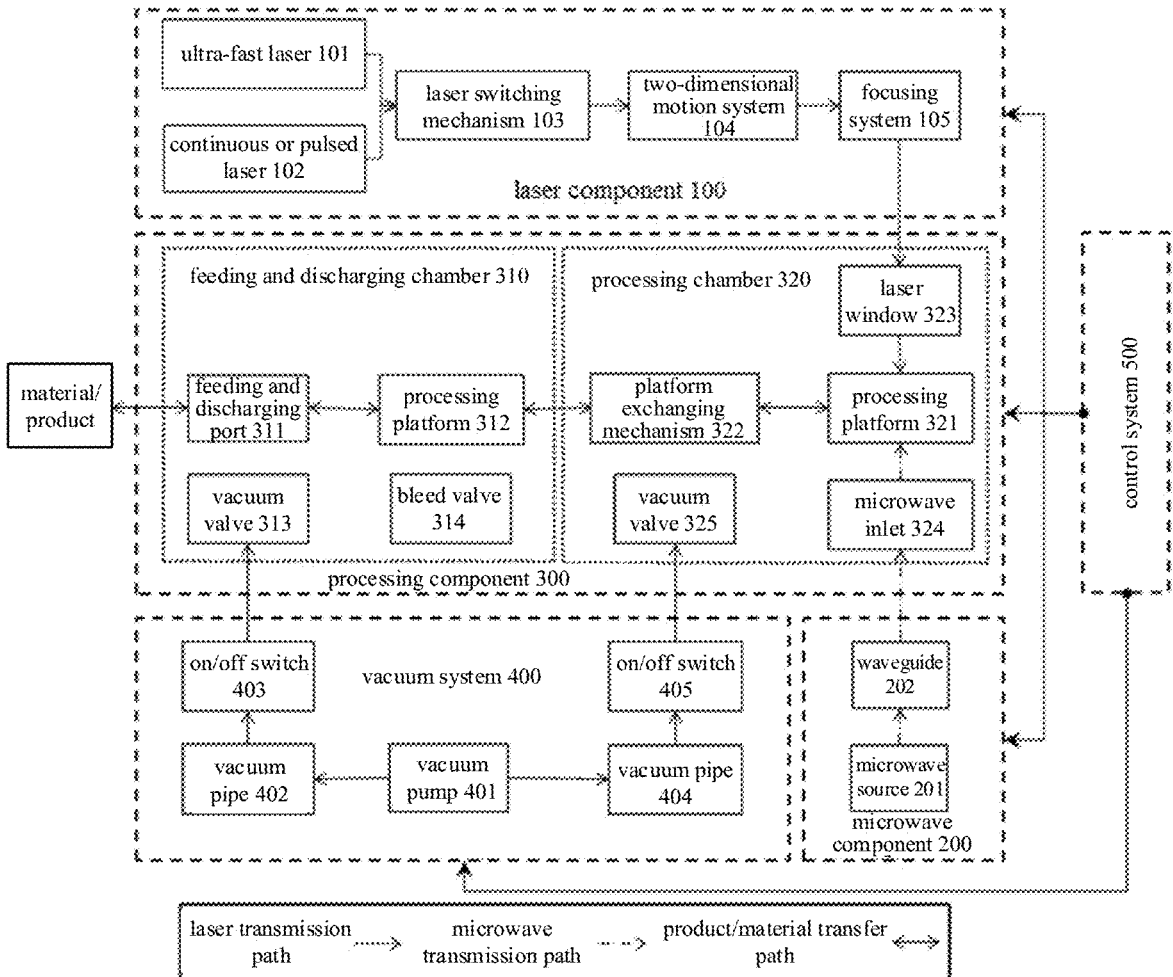
FIG. 3 is a schematic diagram showing a device for preparing a graphene quantum material in an embodiment of the present disclosure.

FIG. 3 is a schematic diagram showing a device for preparing a graphene quantum material in an embodiment of the present disclosure.

The device for preparing the graphene quantum material integrates functions including ultra-fast laser-induced decomposition, continuous/pulsed laser-induced reduction, and microwave heating for expansion, thus realizing the continuous preparation of the graphene quantum material. The device mainly includes five components: a laser component 100, a microwave component 200, a processing component 300, a vacuum system 400, and a control system 500. The laser component 100 mainly provides a laser energy source required in the preparation of graphene, including an ultra-fast laser for inducing the decomposition of a carbon-containing precursor material into graphene, and a continuous/pulsed laser for inducing the reduction of graphene oxide into graphene. The microwave component 200 mainly provides a microwave energy source required in the preparation of graphene to realize the expansion of graphene. The processing component 300 mainly provides an environmental condition required for the preparation of graphene to realize the feeding, preparing, and discharging of a material. The vacuum system 400 mainly provides a vacuum environment condition for the processing component 300. The control system 500 mainly realizes the integrated control of the whole device.

Specifically, a laser transmission path for preparing graphene by the ultra-fast laser-induced decomposition and the continuous/pulsed laser-induced reduction of graphene is as follows: laser is outputted by an ultra-fast laser 101 or a continuous/pulsed laser 102, passes through a laser switching mechanism 103, is outputted to a two-dimensional motion system 104 and introduced into a focusing system 105 to focus the laser, and acts on a processing platform 321 through a laser window 323 to realize the laser-induced decomposition/reduction of the carbon-containing precursor material on the processing platform 321. Specifically, a microwave transmission path for the microwave processing expansion process is as follows: microwave is outputted by a microwave source 201, transmitted through a waveguide 202, and then introduced into a processing chamber 320 of the processing component 300 through a microwave inlet 324, and finally acts on graphene prepared by laser-induced decomposition on the processing platform 321. Specifically, a transfer path of the carbon-containing precursor material is as follows: the carbon-containing precursor is placed on a processing platform 312 through a feeding and discharging port 311 in a feeding and discharging chamber 310, the position of the processing platform 312 in the feeding and discharging chamber 310 and the position of the processing platform 321 in the processing chamber 320 are interchanged through a platform exchanging mechanism 322, and finally the carbon-containing precursor is transferred to the processing platform 321. The transfer path of the graphene quantum material is opposite to that of the carbon-containing precursor material.

In the process of continuously preparing graphene quantum material, the specific feeding and discharging steps of the device are as follows.

Firstly, an on/off switch 403 is closed, and a bleed valve 314 is opened at the same time. When a feeding and discharging chamber 310 reaches atmospheric pressure, a feeding and discharging port 311 is opened.

Subsequently, a graphene quantum dot material that has been prepared on a processing platform 312 is removed, and a carbon-containing precursor material to be processed is placed on the processing platform 312 at the same time, and the feeding and discharging port 311 is closed.

Subsequently, the bleed valve 314 is closed, and the on/off switch 403 is opened at the same time, so that the feeding and discharging chamber 310 is vacuumed and a desired vacuum environmental condition is quickly reached.

Subsequently, an automatic lifting door between the feeding and discharging chamber 310 and the processing chamber 320 is controlled to open, and the platform exchanging mechanism 322 is controlled to exchange the position of the processing platform 312 and the position of the processing platform 321, such that the carbon-containing precursor material to be processed is transferred into the processing chamber 320, and the processed graphene quantum material is transferred to the feeding and discharging chamber 310.

Finally, the automatic lifting door between the feeding and discharging chamber 310 and the processing chamber 320 is controlled to close, and preparation processes such as ultra-fast laser decomposition of graphene, continuous/pulsed laser induction, and vacuum microwave processing are carried out.

Figure 4A:
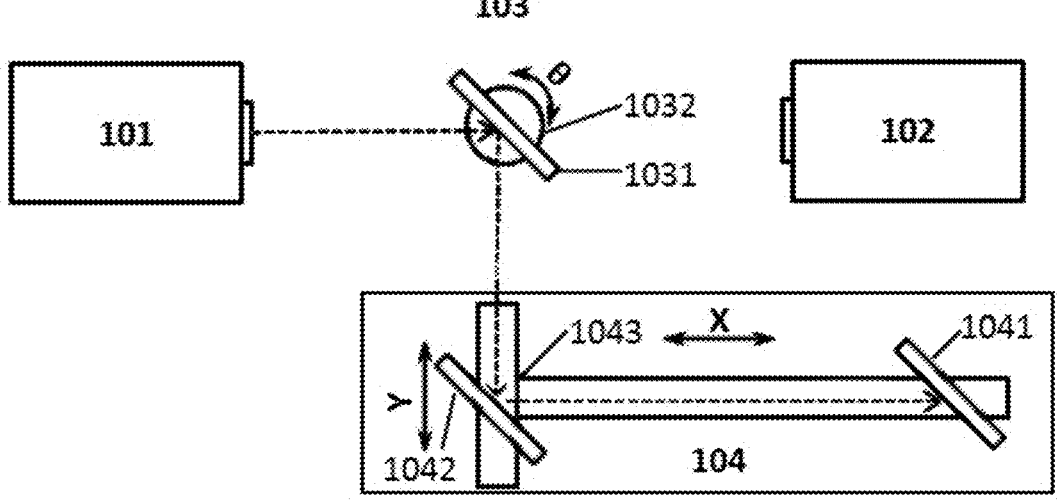
FIGS. 4A-4B are a schematic diagrams showing laser switching involved in an embodiment of the present disclosure, in which 101 denotes an ultra-fast laser, 102 denotes a continuous/pulsed laser, 103 denotes a laser switching mechanism, 104 denotes a two-dimensional motion system, 1031 denotes a first reflector, 1032 denotes a high-precision rotating motor, 1041 denotes a second reflector in the X direction, 1042 denotes a third reflector in the Y direction, and 1043 denotes a two-dimensional motion sliding table.
Figure 4B:
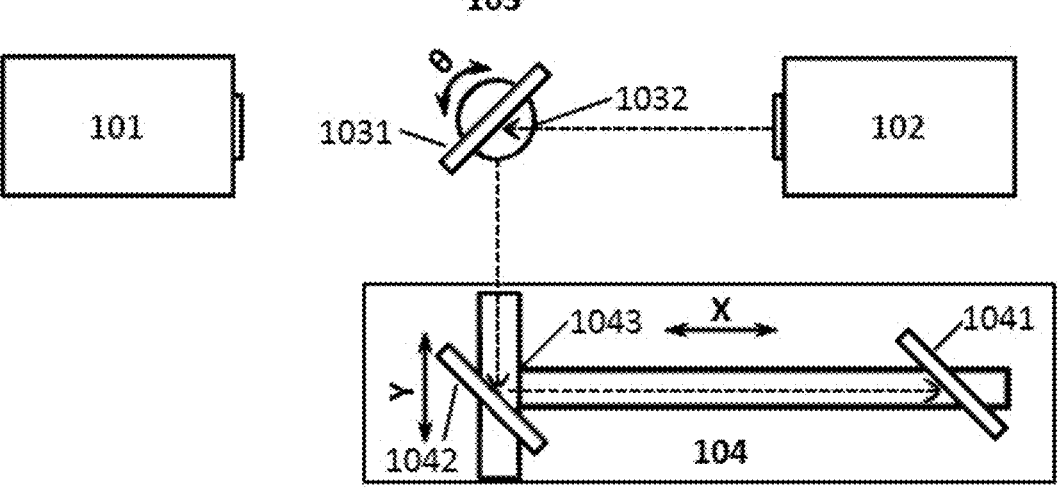

FIGS. 4A-4B are schematic diagrams showing laser switching involved in an embodiment of the present disclosure.

As shown in FIG. 4A, when ultra-fast laser is used for induced decomposition, ultra-fast laser output from an ultra-fast laser 101 is directed into a two-dimensional motion system 104 through a reflector 1031 in a laser switching mechanism 103, and finally directed into a focusing system 105. The two-dimensional motion system 104 includes a reflector 1041 in the X direction, a reflector 1042 in the Y direction, and a two-dimensional motion sliding table 1043. The scanning is realized by controlling the movements of the reflector 1041 in the X direction and the reflector 1042 in the Y direction, and the focusing system 105 also moves together with the two-dimensional motion system 104. When continuous/pulsed laser is used for induced reduction, as shown in FIG. 4B, lasers are switched by regulating a high-precision rotating motor 1032 to control the reflector 1031 to rotate through a specific angle, so that laser output from a continuous/pulsed laser 102 is directed into the two-dimensional motion system 104 and finally directed into the focusing system 105 to realize laser-induced reduction.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

The above description is only a preferred implementation of the present disclosure, and it would be appreciated by those skilled in the art that several improvements and embellishments can be made without departing from the principle of the present disclosure, and these improvements and embellishments should also be considered as the scope of protection of the present disclosure.

What is claimed is:

1. A process for preparing a graphene quantum material, comprising:
   providing a carbon-containing precursor;
   decomposing the carbon-containing precursor with an ultra-fast laser to obtain the graphene quantum material;
   optionally reducing graphene oxide into graphene with a laser; and
   optionally subjecting the graphene quantum material to microwave heating;
   wherein the carbon-containing precursor comprises biomass containing cellulose, lignin, or starch;
   the biomass is selected from plant biomass, comprising crop straws and husks, wood, wood chips, barks, branches, roots, leaves, fruits and vegetables;
   wherein providing the carbon-containing precursor comprises:
      adding one or more of powders of an organic polymer and powders of a non-polymeric carbon material to flakes or powders of the biomass;
   the organic polymer comprises at least one of polyimide (PI), polyethylene (PE), and polypropylene (PP); and
   the non-polymeric carbon material comprises at least one of graphite, charcoal, carbon black, coal.

2. The process of claim 1, wherein the graphene quantum material comprises at least one of graphene powders, graphene quantum dots, graphene mesoporous materials; and the process further comprises:
   coating a substrate with one or more layers comprising the graphene quantum material.

3. The process of claim 1, further comprising:
   drying the plant biomass; or
   carbonizing the plant biomass under vacuum.

4. The process of claim 1, wherein decomposing the carbon-containing precursor comprises:
   adding one or more of graphite quantum dots, graphene oxide quantum dots, and graphene quantum dots to the carbon-containing precursor as a catalyst.

5. The process of claim 1, wherein the ultra-fast laser is picosecond laser or femtosecond laser.

6. The process of claim 1, wherein the ultra-fast laser is at an ultraviolet to near-infrared, mid-infrared, or far-infrared wavelength region, and in a wavelength range of 200 to 14000 nm.

7. The process of claim 1, wherein the ultra-fast laser is single-wavelength laser, dual-wavelength laser, multi-wavelength laser, or a combination thereof.

8. The process of claim 1, wherein decomposing the carbon-containing precursor with the ultra-fast laser comprises:

decomposing the carbon-containing precursor with laser points or lines at a processing position selected from a laser focusing position or a laser defocusing position in a laser scanning mode selected from single continuous scanning or multiple cyclic scanning.

9. The process of claim 1, wherein the laser for reducing the graphene oxide into graphene is selected from continuous laser or pulsed laser.

10. The process of claim 1, wherein the laser for reducing the graphene oxide into graphene is at an ultraviolet wavelength region of 200 to 400 nm, a visible wavelength region of 400 to 760 nm, or an infrared wavelength region of 760 to 14000 nm.

11. The process of claim 1, wherein reducing graphene oxide into graphene with the laser comprises:

reducing graphene oxide into graphene with laser points or lines at a processing position selected from a laser focusing position or a laser defocusing position in a laser scanning mode selected from single continuous scanning or multiple cyclic scanning.

12. The process of claim 1, wherein the microwave heating is carried out by a microwave in an inert environment or in a vacuum environment, and the microwave is selected from continuous microwave or pulsed microwave.

* * * * *